Feb. 9, 1971 O. VISCONTI 3,561,165
UNIVERSAL GRINDING MACHINE FOR SCISSORS AND SHEARS
Filed June 28, 1967 7 Sheets-Sheet 1

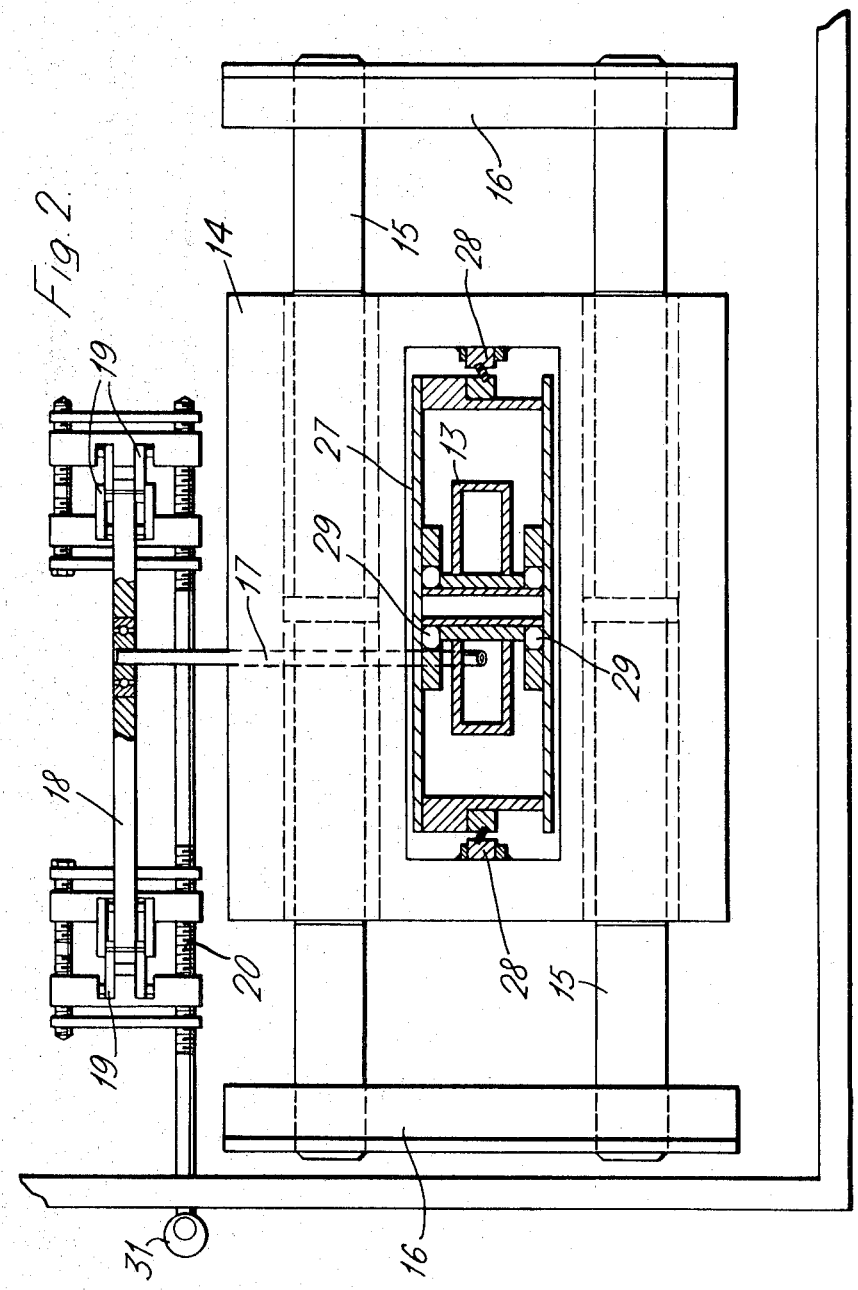

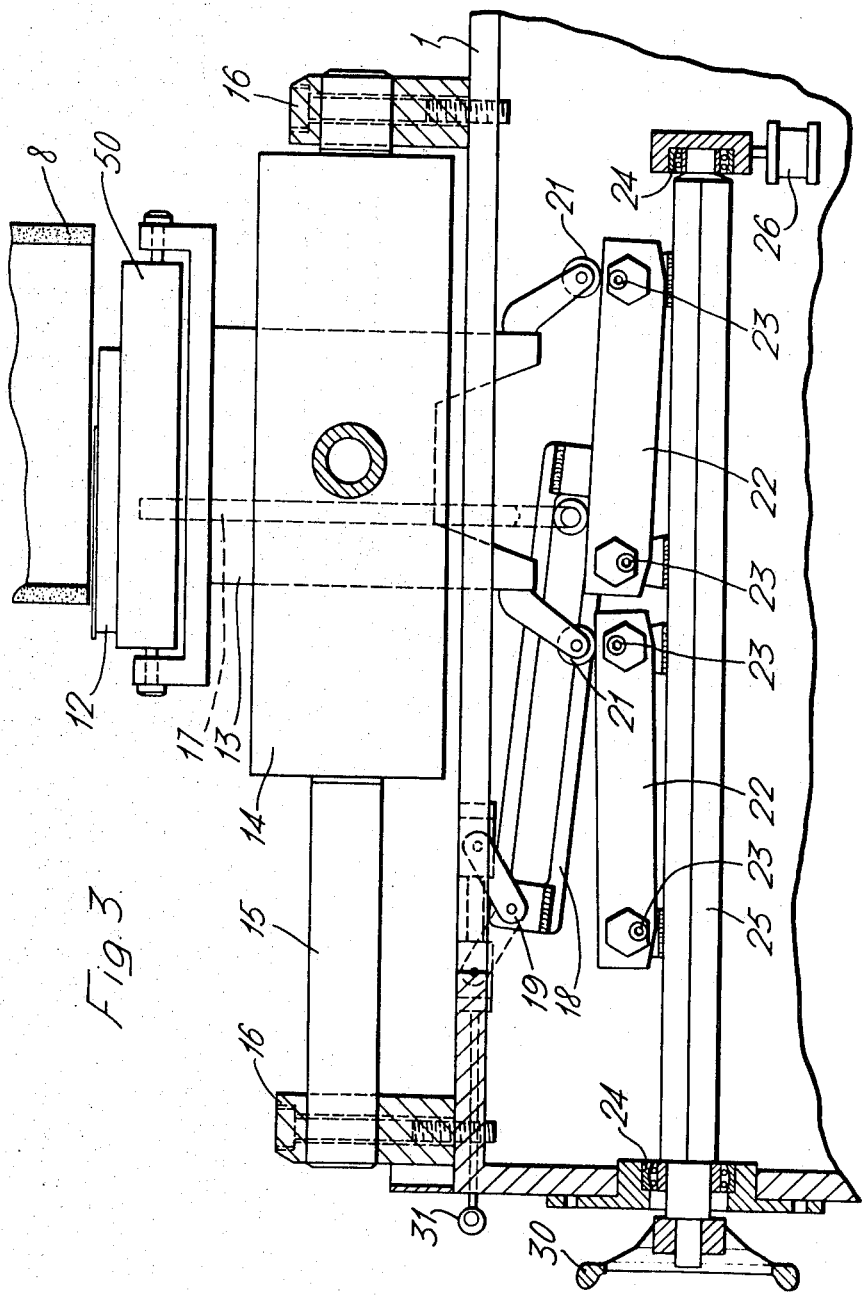

Feb. 9, 1971         O. VISCONTI         3,561,165
UNIVERSAL GRINDING MACHINE FOR SCISSORS AND SHEARS
Filed June 28, 1967         7 Sheets-Sheet 4
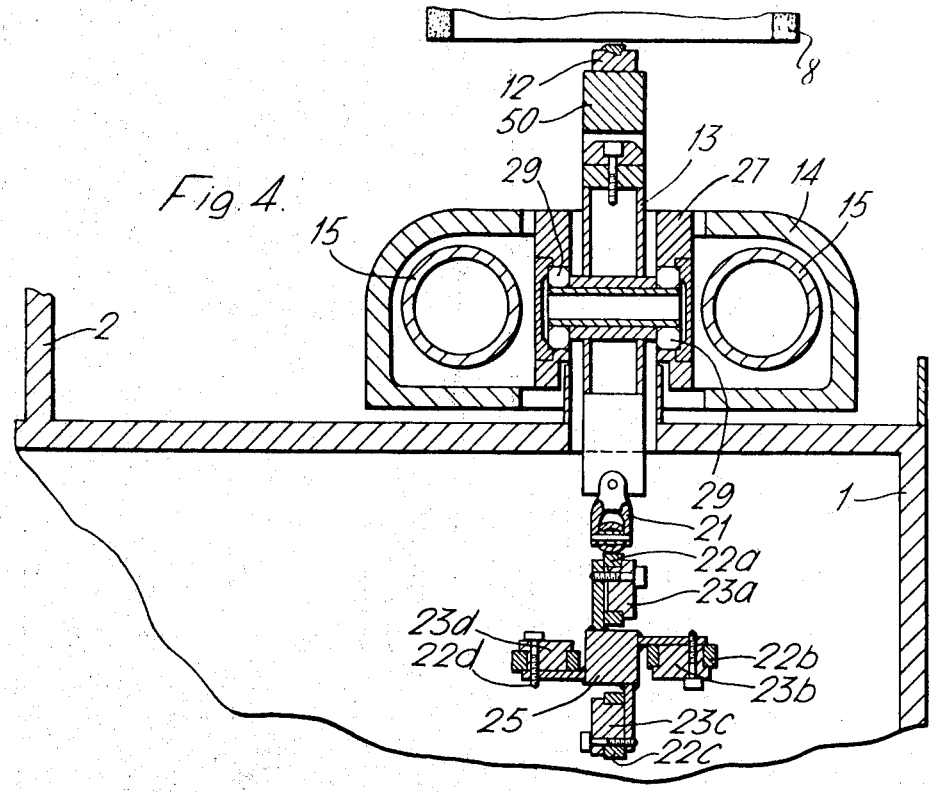
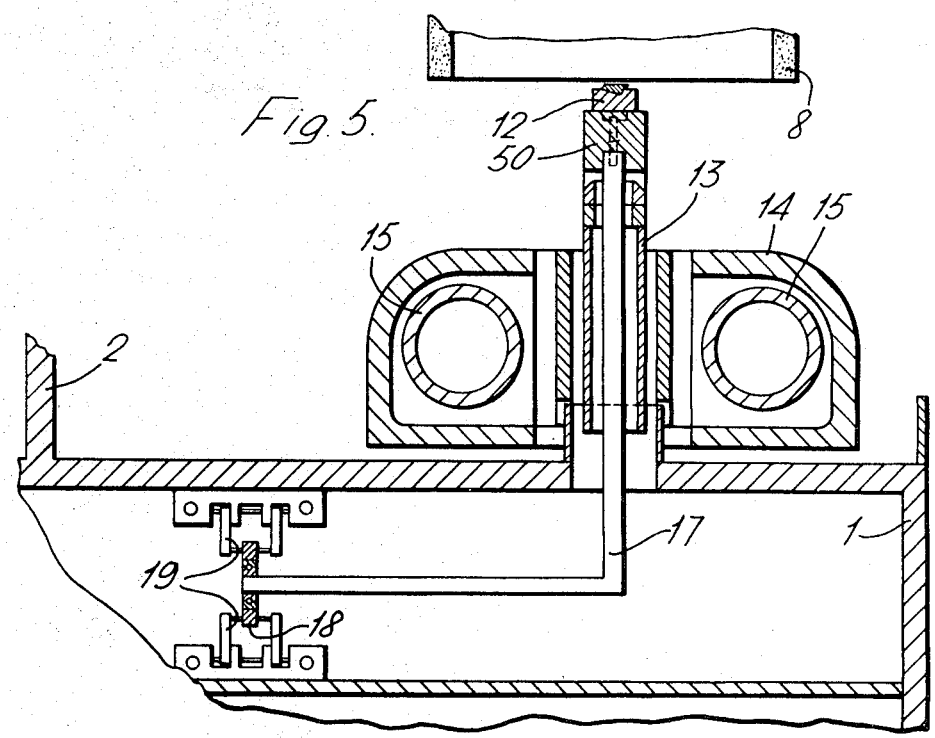

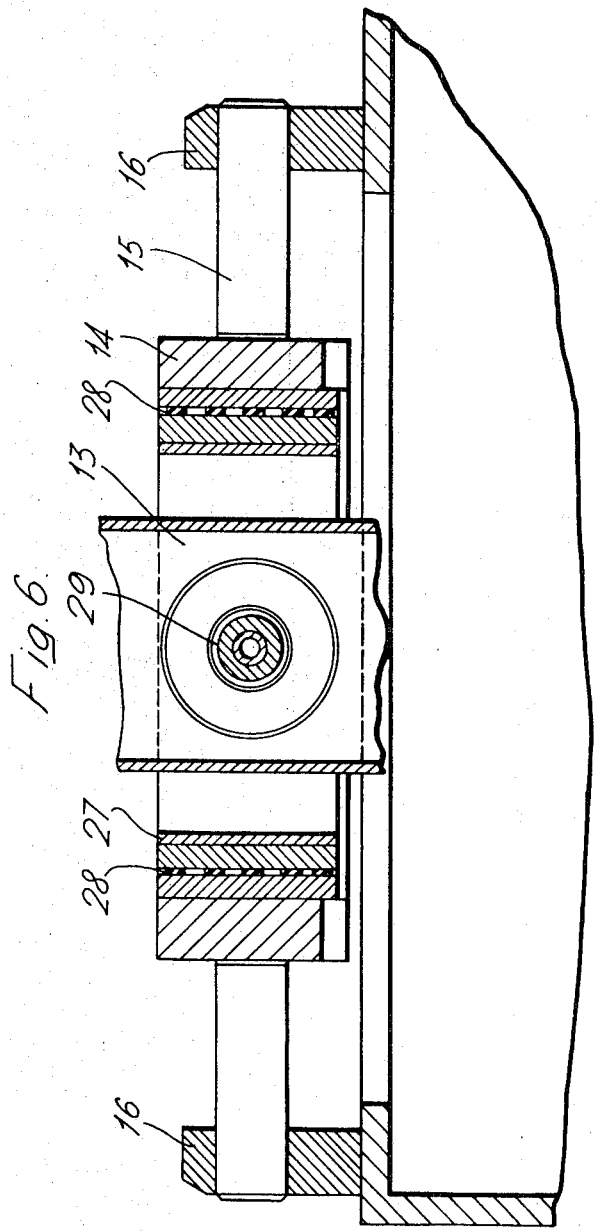

United States Patent Office 3,561,165
Patented Feb. 9, 1971

3,561,165
UNIVERSAL GRINDING MACHINE FOR SCISSORS AND SHEARS
Ottorino Visconti, 11, V. Carducci, Milan, Italy
Filed June 28, 1967, Ser. No. 649,587
Claims priority, application Italy, Dec. 22, 1966, 31,407/66
Int. Cl. B24b 7/02, 9/00, 47/06
U.S. Cl. 51—122        10 Claims

ABSTRACT OF THE DISCLOSURE

A universal grinding machine having a cup grinding wheel carried upon an upright rotary shaft which is movable about a horizontal axis that passes through a working edge of the cup grinding wheel, a horizontally movable slide carrying a pivotal work holder, a driver within the slide for guiding the work holder, and a reservoir for cooling liquid in the base of the machine with continuous filtering for performing flat or hollow grinding, particularly on the blades of scissors, shears, knives and the like.

---

In the machine grinding of blades of scissors, shears, knives and the like and generally in the grinding of items which do not have flat or cylindrical surfaces, the machines used are derived from those which are designed for the processing of flat surfaces with the provision of additional devices for adaptation to the required working conditions but these still approximate to the conditions for the processing of flat surfaces. Such machines only partly reproduce the conditions necessary to obtain the results required by modern standards and do not take into account various situations which are encountered by the operators in connection with the continually varying requirements of production.

From the above observations, it will be appreciated that it is desirable to construct a completely new machine which can embody in a single unit all the means required for easy adjustment in connection with the necessary operations, which may allow for variations in the work programme, and which can provide a high grade of finishing while maintaining a high productive rate.

The machine which is hereinafter described has been constructed to avoid the inconveniences and defects shown by the existing known machines, and thus to provide for universal use, higher hourly output, much quicker setting, and a lower wear of the grinding wheel for each processed part.

According to a principal feature of the present invention there is provided a universal grinding machine comprising a cup grinding wheel on an upright rotary shaft which is arranged to be swung about a horizontal axis which passes through the working edge of the grinding wheel and is perpendicular to the direction of movement of the workpiece so that flat or hollow grinding can be performed, the grinding wheel being rotatable in both directions so that the machine can act as a right-hand or left-hand grinding machine.

Features of importance of the machine which is hereinafter described are as follows:

(a) The grinding wheel rotates on a shaft which is amply portioned and provided with means to avoid axial and radial play at the bearings.

(b) The shaft is driven through a V-belt transmission, also amply dimensioned, which allows the grinding wheel to revolve at the most suitable speed in relation to the kinds of abrasive and bonding material employed, and to the diameter of the wheel. In addition, it can be made to revolve in either direction, through the action of an electrical switch.

(c) The grinding wheel and motor assembly can be swung in relation to the base of the machine in such a way that the shaft can occupy an angle between zero and the required maximum, to obtain flat grinding (infinite radius), hollow grinding (to a radius of a few inches), and also convex grinding.

(d) The slide which carries the workpiece is reciprocated through a hydraulic set-up incorporated in the slide, without any additional coupling to promote maximum rigidity and minimize play. In addition, the whole unit is lubricated by the oil circulating in the hydraulic cylinder and thus requires minimal maintenance.

(e) The workpieces being processed are appropriately positioned, along their lengths, by a control unit which is incorporated in the slide. In this arrangement, all forces are directly and vertically transmitted to cams which are placed just under the slide, thus producing no side pressure or flexion.

(f) The driving unit comprises linear cams placed just under the slide, on which ball-bearing followers rotate without the need for couplings and with minimal friction (at a 1:1 ratio).

(g) Control cams are mounted in pairs on a rotatable shaft which permits several successive set-ups of the machines without eliminating the former ones as well as permitting a return to a former set-up by repositioning the original cams.

(h) The driving unit is provided with a coupling which allows the workpiece to be guided along the whole stroke of the machine according to the required operation, and with a hydraulic unit which separates the workpiece from the grinding wheel during the return stroke.

(i) The base of the machine is used also as a container for cooling liquid and embodies a filtering unit on a chain drive. Such a unit continuously purifies the circulating liquid and deposits sediment outside the base.

(j) The cooling liquid is conveyed to the workpieces being processed through the hollow shaft of the grinding wheel, and is thus directly projected on the workpieces to effect maximum cooling.

(k) The workpiece is held in position by an automatic holding unit hydraulically operated and synchronised with the movement of the slide.

An embodiment of the present invention will now be described, by way of example, with reference to the accompanying drawings in which:

FIG. 2 is a top plan view with parts in section of the driving system of the machine;

FIG. 3 is a side view of the driving system;

FIGS. 4, 5 and 6 are sectional views of parts of the driving system;

Figure 1A:
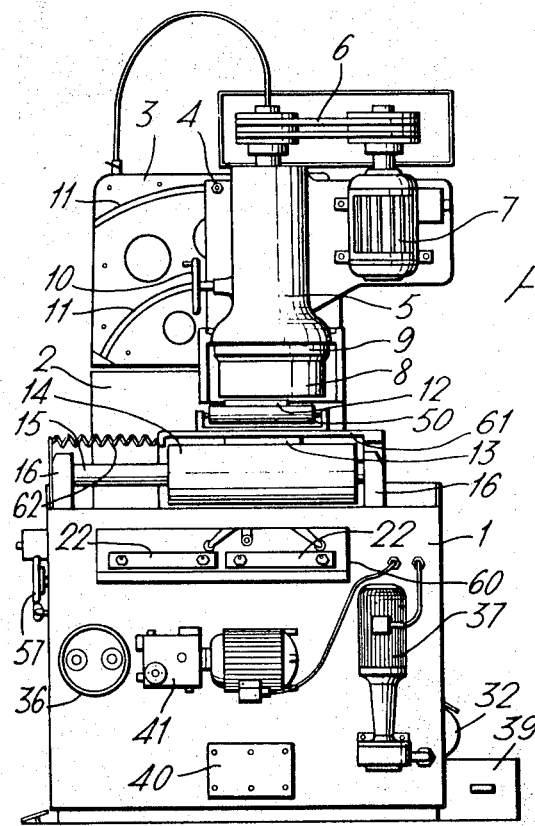
FIGS. 1A and 1B are respectively front and side elevational views of a universal grinding machine.
Figure 1B:
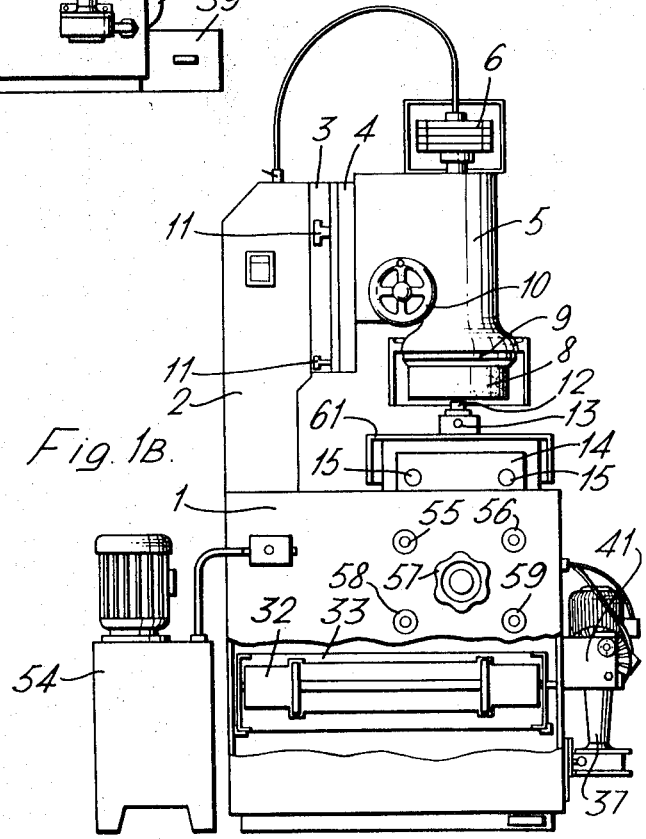

A main characteristic, shown in FIGS. 1A and 1B, which substantially differentiates the present machine from the prior art is that the present machine is constructed as a single unit and it is not necessary to construct "right" or "left" units nor to run units in pairs or sets. Such negative characteristics of prior machines caused an unavoidable restriction in use of the individual machines when set up in pairs. The prior machines are actually bound to that very type of operation for which they are designed, i.e. for grinding one side of the workpiece; thus they may be kept idle when there is only a single side to be processed and that side is the opposite to that for which the available machine is designed. The present invention obviously raises the possibility of doubling production of each required side without the need to have or set-up a double number of machines and without risking any idle time of the machine. Such a possibility is realized by mounting the head 5 bearing the grinding shaft and motor 7 above the base 1 by means of a supporting block 2, and by placing the workpiece, being processed, on holder 12 horizontally above said base.

Such a solution has never been envisaged in the processing of shaped surfaces such as used in the cutlery industry (particularly in shears and scissors and knife blades), or in any other industry. It is a requirement in adopting such a system that the grinding wheel should run in either direction, so that it could operate alternately as "left" or "right" in respect to the position of the "stop" provided to restrain the workpiece; the workpiece is pushed by the rotation of the wheel against the stop.

Prior machines were intended to be either "left" (when the grinding wheel was placed at the left side of the workpiece) or "right" (when the wheel was placed on the right side of the workpiece), each machine being specifically designed just for the processing of one side of the part in relation to the arrangement for restraining the parts, and to the other characteristics of the parts themselves.

Clearly, when combining the above vertical head, the cup wheel and the possibility of running the wheel both ways, a unique and original assembly of characteristics is obtained, regardless of any different machines which may have selectively incorporated these individual characteristics; the characteristics may be individually unsuccessful in obtaining the required results.

Another characteristic of the machine herein described is that the cup wheel 8 has been placed in such a way as to permit it being used both in flat and hollow grinding, without any reciprocal displacement between the working edge of the grinding wheel and the workpiece being processed. To the same end the complete motor 7 and grinding wheel spindle assembly are arranged independent of base 1 and to turn about a horizontal axis passing through the working edge of the cup wheel. In this way, the wheel can be placed, with respect to the workpiece, at an exact angle which is infinitely variable between 0° and the maximum required for hollow grinding (usually 25°/30°) without any need to provide, for each angle, a new position for the workpiece and the bearing parts.

The solution to the problem in question is obtained by way of example, by providing on a plate 3 a set of T slots 11 concentric to said axis and attaching the plate to a head carrier slide 4 by means of bolts. In such a way the unit can turn about the said axis while maintaining a radial position in respect of the axis. Obviously, this could be obtained by means of an alternative construction within the scope of the invention.

The possibility of performing hollow grinding already existed in prior proposed machines, but the solutions to the associated problems were incomplete and unsatisfactory. In fact in machines using disc grinding wheels, it is only possible to perform hollow grinding to a grinding diameter continuously at variance with the diameter of the grinding wheel. Also flat grinding is quite impossible no matter how large the initial diameter of the grinding wheel may be.

In fact, in machines using cup grinding wheels, normally the workpieces and the related parts swivel in respect to the axis of the grinding wheel, while the motor and the spindle are fixed to the base. In any case, it has not previously been possible to have either continuously variable positions or suitable devices to hold steady, at various angles, the reciprocal position of the workpieces in respect to the working edge of the grinding wheel.

From the above it will be evident that with the machine according to the present invention, a change from flat grinding to hollow grinding can be obtained by the simple rotation of the complete motor and spindle assembly in the T slots, and that the effective grinding diameter can be directly read on an appropriate dial set in relation to any one of the concentric slots.

In fact, the grinding diameter obtained when using cup wheels is a linear function of the diameter of the grinding wheel and of the angle between the axis of the wheel and the surface of the workpiece. This grinding diameter can be fixed or prearranged and is repeatable as desired; also the grinding diameter is entirely independent of the wear of the wheel itself and this is quite different from the results obtained when employing disc wheels.

Another characteristic of the machine herein described is that all the parts required for the positioning of the workpiece have been arranged in a space inside movable slide 14 so as to assure maximum compactness and rigidity, which is to the advantage of the degree of finish obtainable. Also, all the driving and control parts necessary to assure the required reciprocal movements of the workpiece in relation to the grinding wheel, are arranged under the top of base 1 at the minimum possible distance, and therefore in conditions of maximum rigidity. The parts are also completely sheltered from the abrasive substances present and from the cooling liquid employed in the grinding process. This differentiates from prior machines in which the various components were spaced at some distance apart on the base, and were poorly protected from the cooling liquid and the abrasive substances, or were even openly exposed to them.

Another important, but possibly not indispensable, characteristic of the present machine is that the movement of the slide 14 is obtained by incorporating a hydrodynamic drive inside of the slide itself. The slide is guided on rods 15 placed in pairs one on each side of the driving unit and rigidly fixed to the base 1, through a pair of metal blocks 16 drilled to provide conduits for the hydrodynamic drive. Such a solution provides the complete elimination of flexible or visible pipes but it can also be substituted by a conventional dove-tail slide with separate hydraulic pistons, without detracting from the originality of the basic invention.

Another important but possibly not essential characteristic of the present machine is that it is provided with an original driving unit, which may be of importance per se, but which will now be described as an integral part of the machine.

It is known that for the operation of any machine tool which removes material by, for example, a steel tool or a grinding stone, a suitable system should be provided to regulate a reciprocating slide base or head carrying the tool or wheel, so as to maintain the tool or wheel at a suitable distance from the workpiece and to reproduce a definite profile or surface on the workpiece.

The problem has been more or less solved, when dealing with steel tools either moving rectilinearly or rotationally, or when dealing with flat or cylindrical grinding. However, it had not been completely solved when dealing with the grinding of other shaped pieces, and specifically with workpieces to be produced with surfaces other than flat or cylindrical. Besides, with the formerly known arrangements it was not possible to repeat a prearranged programme without having to provide for adjustment of the driving system. The aim of the present feature of the invention is thus to provide a driving system which, in addition to providing for the required guiding of the workpiece in a specified operation, can also reproduce the original conditions after the machine has been reset to a different operation; that is to say that it can follow a programme.

To effect the first requirement, it is necessary to provide the slide with (a) the necessary joints to permit free movements of the workpiece holder at any point during the working stroke; (b) the necessary holding means to position the workpiece in the required manner at any point during the stroke, and (c) a guiding means to allow the repetition of the original set-up and the possibly repeated execution of alternative set-ups without having to repeat all the adjustments. All these requirements are now in the present machine. With reference to the drawings, the guide unit 13 is positioned inside the slide 14 which is formed with a cavity located between the rods 15 of the hydraulic drive. A frame 27 formed by fusion or welding of steel plates is furnished with rectilinear slides 28 of hardened steel with rollers or balls. This arrangement achieves a running coupling of high precision and of great rigidity in the small space existing under the slide.

The frame 27 can thus shift, inside the main slide, in a vertical plane between the axes of the rods 15 and containing the axis of the grinding wheel shaft, thus achieving one of the necessary movements.

Inside the frame 27 is located the guide unit 13 which pivots on two ball bearings 29 thus allowing rotation on a horizontal axis which is perpendicular to the axis of slide 14.

For following the freedom of movement given by the rectilinear slides 28 and of bearings 29, the guide unit 13 is free to shift vertically, to rotate around a horizontal axis, and also to move freely in two of the spatial directions necessary for the positioning of the workpiece.

The third required spatial movement is provided by means of block 50 which carries the work holder 12 and turns on a horizontal axis which is also parallel to the axis of the slide 14. As shown in the drawings, pivotal joints are embodied in the work holder, but alternative means may, of course, be provided. A fundamental, even if not essential, characteristic of the arrangement is, however, the system by which the rotation of the work holder is controlled. FIGS. 2 and 5 show the disposition of operating rod 17 which is firmly attached to the work holder 12 and passes through the guide unit 13. Resting inside the unit 13 and thus completely protected and unseen, the rod 17 receives rotational movement from the action of a double cam 18 which can be placed in the desired positions and angles by setting arms 19 through threaded rod 20 which is controlled from handle 31 outside the machine. The double cam 18 guides the rod 17 independently of the direction of the force transmitted to the workpiece by the rotation of the grinding wheel, as described. Guiding of the workpiece through the movements permitted by the rectilinear slides 28 and by the bearings 29 is obtained through the action of a pair of cams 22 on which travel a pair of cam followers 21. Such followers transmit to the guide unit 13 the displacements and the rotations imposed by the position of the cams 22, positions that can be preset through eccentrics 23 which rotate in appropriate bearings on shaft 25. The free movement permitted by the rectilinear slides 28 allows also the transmission to the guide unit of the movements imposed on the shaft 25 by the movements of hydraulic piston 26 coupled to it.

The shaft 25 is mounted on a pair of oscillating bearings 24 which permit displacement in a vertical plane parallel to the axis of the slide 14. Through an appropriate hydraulic coupling between the slide 14 and the piston 26, it is thus possible to lower the workpiece during the return stroke of the slide (in the drawing from left to right) and to bring it again into contact with the grinding wheel during the working stroke of the slide (in the drawing from right to left).

It follows that the workpiece will assume, in respect of the grinding wheel 8, during the working stroke of the slide 14, any one of the positions that it can occupy when the cam 18 and the pair of cams 22 are positioned at suitable angles in respect to the axis of the slide 14; in particular, the workpiece may rotate around two perpendicular axes and slide along a third axis at right angles to the first two, thus providing a system of guides in three dimensions which is necessary to achieve the objective proposed.

In order to obtain repetition of the process without being forced to set the machine continuously, one may rotate the shaft 25 through wheel 30 situated at the front of the machine, in order to place under the cam followers 21 any one of the pairs of cams 22a, b, c, d, etc., each of which can be positioned as desired through the relative pairs of eccentrics 23a, b, c, d, etc.

Consequently, once a setting is established through the appropriate positioning of one pair of the aforementioned cams, it will be possible to pass to another setting by rotating shaft 25 until another pair of cams is placed under the cam followers 21; this different setting can be adjusted without cancelling the preceding setting. It will be equally possible to return to any one of the settings already prearranged, placing again in relation to the cam followers the pair of cams required, and in this way a programme of work can be achieved.

An analogous programme could be prescribed for the rotation of the rod 17 that controls the workpiece holder 12. In the present machine such a double programme has for simplicity not been illustrated.

Figure 8A:
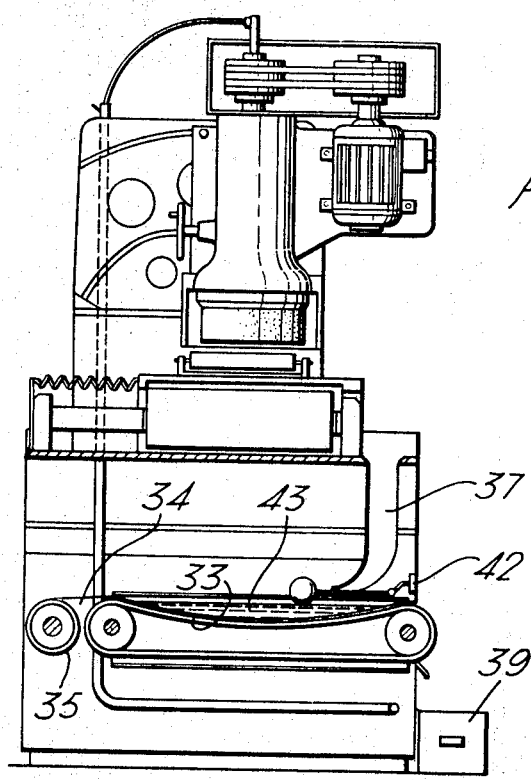
FIGS. 8A and 8B show the liquid cooling and filtering system.
Figure 8B:
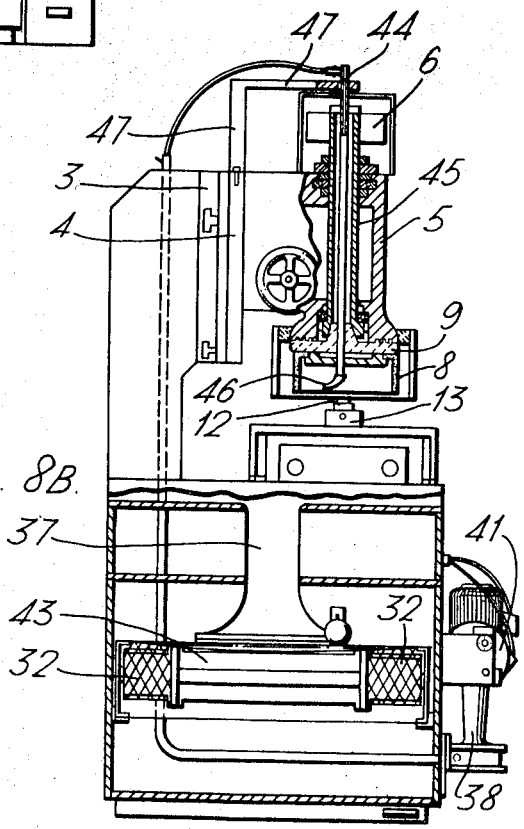

Another important feature of the present machine is that the base 1 of the machine itself is utilized as a basin to contain the cooling liquid as well as the following unit illustrated in particular in FIGS. 8A and 8B.

From FIGS. 8A and 8B it will be noted that a pair of shafts 32 carry a chain conveyor 33 on which filtering material 34 is unrolled from a reel 35 also placed inside the base across an opening 36 (FIG. 1A) provided for it. The cooling liquid that descends through a collection system 37 is thus filtered before reaching circulation pump 38 and being returned to effect further cooling. This permits reutilisation of the cooling liquid from which metallic residue and abrasives have been removed, and thus a superior finish may be obtained.

The arrangement adopted also permits continuous discharge of metallic residue and abrasives, through a back opening in the base of the machine into an appropriate receptacle 39 placed outside the base. In this way, the necessity of replacing the cooling liquid and removing the residue from the inside of the base 1 is eliminated or reduced to a minimum.

It is hence sufficient to provide only a small opening 40 (FIG. 1A) in the lower part of the base-basin from which the possible light or residue deposits, which might be discharged at intervals have passed across the mesh of the filtering cloth.

For renewing the filtering material saturated by residue and not in condition to permit the passage of the full quantity of cooling liquid circulating in the machine, a motor 41 is provided to drive one of the shafts 32 of the conveyor 33. This provides for advancement of the filtering material at suitable intervals, according to the impulses transmitted to a switch by float 42 which follows the level of liquid 43 to be filtered. In such a way part of the filtering material which is by now saturated, is eliminated and substituted in equal part with new material; it will be appreciated that when the level of the liquid to be filtered falls, the motor 41 stops.

The motor 41 and the float 42 could obviously be substituted by a hand control with an external wheel, or by a hydraulic control synchronised to the motion of the slide.

Another important characteristic of the cooling system in the present machine resides in an arrangement for conducting the cooling liquid to the vicinity of the workpiece being processed. Referring in particular to FIGS. 8A and 8B, a tube 44 passing inside shaft 45 and flange 9 carrying the grinding wheel, carries the cooling liquid to a nozzle 46 located inside the wheel 8 in proximity to the workpiece.

By the centrifugal effect of rapid rotation with the grinding wheel, the cooling liquid is thrown against the workpiece, thus assuring cooling in all working conditions and assuring a minimum distortion of the workpiece itself as a lower degree of heat is developed by the grinding wheel.

Another characteristic of the present machine is that the top end of the tube conveying the cooling liquid to nozzle 46 is connected to an arm 47 (FIG. 8B) forming part of the head-carrying slide 4. With this arrangement, the tube itself remains fixed in respect of the workpiece regardless of the position of the head 5 which is determined by means of wheel 10 acting through a pair of right-angle gears and a shell-to-screws assembly, when compensating for wear of the grinding wheel 8. The nozzle 46 thus remains always oriented and positioned in the way desired, independently of the wear on the grinding wheel and of the movements of rotations of the head, although being adjustable in position from the upper part of the machine.

Figure 7A:
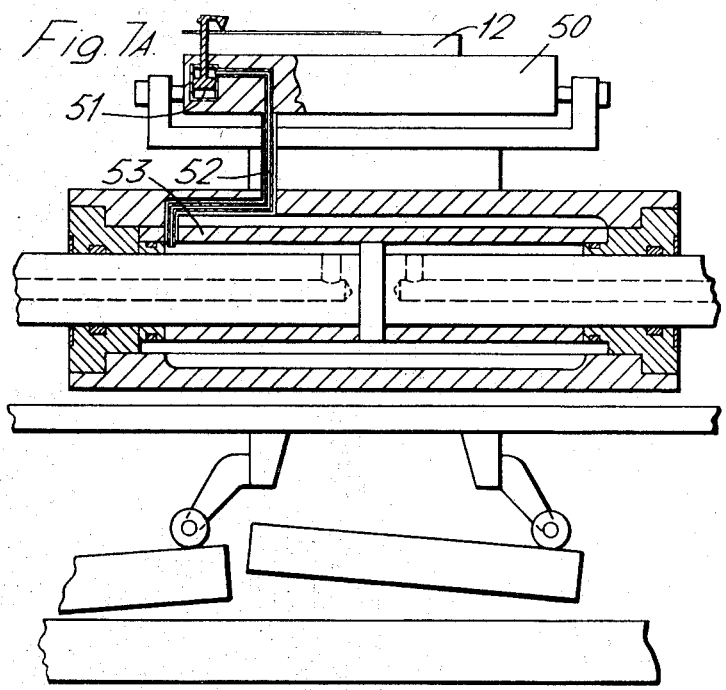
FIGS. 7A and 7B show the work holding unit.
Figure 7B:
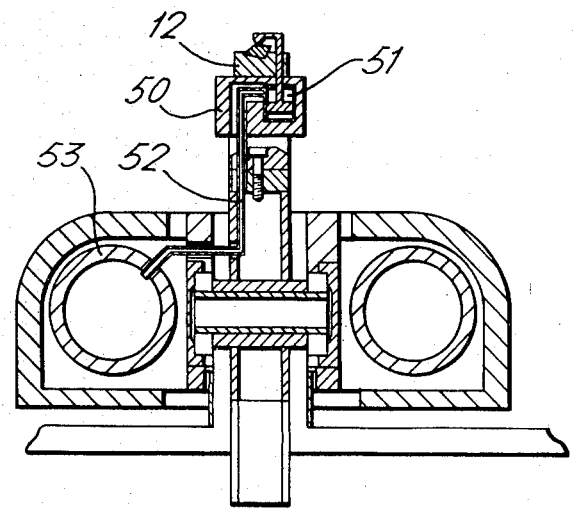

Yet a further characteristic of the present machine is the hydraulic system of locking the workpiece in position on the work holder 12. As illustrated in FIGS. 7A and 7B, this locking is obtained by means of a hydraulic piston 51 arranged inside block 50 and which receives hydraulic pressure through a flexible coupling 52 directly from one of the hydraulic cylinders which control the slide 14. In this way the workpiece is locked during the active stroke of the slide 14 when a hydraulic pressure exists inside of the appropriate rod cylinder and is automatically released when the slide is stopped at the end of the stroke, in the stop and unloading position of the machine.

The hydraulic pressure necessary for the operation of the machine is supplied by a conventional hydraulic pump 54 (FIG. 1B) mounted at the side of the machine and connected by appropriate flexible pipes.

The rotation of the grinding wheel 8 at the most suitable speed according to the type of bonding used in the wheel and to the diameter of the grinding wheel, is obtained by means of V-belt transmission which is provided with a suitable guard.

The controls of the machine are placed on the front side, i.e., the side shown in FIG. 1B. These control are as follows:

55 and 58 are the controls for the rotation of rod 17 and work holder 12, respectively;

56 is the manual control for the hydraulic shifting of the slide 14;

57 is the selection wheel for the programmes on shaft 25; and 59 is the speed control for the slide during the active stroke.

The regulation of the cams 22 may be carried out through opening 60 (FIG. 1A) provided on a side of the machine where there are contained, in a water-tight compartment, separated and protected from the dust and cooling liquid, the devices which are necessary for the regulation and control of the machine.

For the complete protection of the parts exposed to cooling liquid, i.e. the rods 15 and the upper parts of the driving unit 13, a steel shield or hood 61 and bellows 62 are provided.

Another characteristic of the present machine is that the slide 14 may make a fast return stroke at the end of the working stroke, regardless of how low the speed of the work stroke must be, thus permitting a fast withdrawal of the workpiece from the wheel and so promoting rapid operation.

What I claim is:

1. A universal grinding machine comprising a base, means including an upright plate mounted upon said base, said plate having a pair of arcuate slots, a head pivotally mounted on said plate, a cup grinding wheel mounted upon a rotary shaft, said wheel being carried by said head, means on said base for moving a workpiece relatively to the grinding wheel, means for effecting rotation of the grinding wheel in opposite directions so that the machine can act as a right-hand or left-hand grinding machine, slide means on said head adapted to be secured in said arcuate slots of said plate, said slide means being movable in said slots whereby the grinding wheel is arranged for pivoting movement about an axis which passes through a working edge of the grinding wheel, said axis being perpendicular to the rotational axis thereof and perpendicular to the direction of movement of the workpiece, said arcuate slots being concentric to said axis, so that flat or hollow grinding can be performed.

2. A machine according to claim 1, in which the means for moving the workpiece comprises a hydraulically driven reciprocatory slide.

3. A machine according to claim 1, in which the means for moving the workpiece comprises a reciprocatory slide and guide means therefor are contained inside the slide itself and arranged compactly to minimize axial or radial play.

4. A machine according to claim 3, in which said guide means are contained in a compartment situated under the reciprocatory slide.

5. A machine according to claim 4, in which means for controlling and guiding the movements of the workpiece are provided with pivotal joints incorporating revolving devices and are provided with attachments to resist play whilst permitting the positioning and guiding of the workpiece along the working stroke and separation of the workpiece from the grinding wheel during the return stroke.

6. A machine according to claim 1, in which cams for controlling the movement of the workpiece are mounted in pairs on a rotatable shaft which permits the selecting of pairs of cams and the corresponding settings according to the grinding requirements for the workpiece as well as a change to a different setting without cancelling the preceding setting, and the resumption of a preceding setting, by a simple rotation of the shaft.

7. A machine according to claim 2, in which hydraulic means lower the workpiece on its return stroke at the end of the work stroke and bring the workpiece back into contact with the grinding wheel during the working stroke of the reciprocatory slide.

8. A machine according to claim 4, in which cooling liquid is contained in said base and a filtration belt is arranged to purify the liquid and carry sediment to the outside of the machine.

9. A machine according to claim 8, in which cooling liquid is projected onto the workpiece from inside the grinding wheel through a tube inside the wheel shaft.

10. A machine according to claim 2, in which the workpiece is locked by hydraulic means fed with hydraulic pressure derived from that for driving the reciprocatory slide, so that the workpiece is automatically locked during the working stroke of the machine and may be unlocked in a loading or rest position.

References Cited

UNITED STATES PATENTS

| 2,753,667 | 7/1956 | Whitelaw | 51—118 |
| 2,998,679 | 9/1961 | Mattison | 51—109 |
| 2,804,735 | 9/1957 | Comstock | 51—233 |
| 2,958,988 | 11/1960 | Crosby | 51—122 |

OTHELL M. SIMPSON, Primary Examiner

U.S. Cl. X.R.

51—233